United States Patent [19]

Foster

[11] Patent Number: 4,626,719
[45] Date of Patent: Dec. 2, 1986

[54] STEPPING MOTOR HAVING ROTOR WITH AXIALLY SPACED SECTIONS

[75] Inventor: Ronald K. Foster, Rockford, Ill.

[73] Assignee: Warner Electric Brake & Clutch Company, South Beloit, Ill.

[21] Appl. No.: 171,096

[22] Filed: Jul. 22, 1980

[51] Int. Cl.⁴ ............................................. H02K 37/00
[52] U.S. Cl. ..................... 310/49 R; 310/114
[58] Field of Search ............... 310/49, 112, 114, 126, 310/162-165

[56] References Cited

U.S. PATENT DOCUMENTS

| | | | |
|---|---|---|---|
| 3,171,049 | 2/1965 | Jarret et al. | 310/114 X |
| 3,293,460 | 12/1966 | Rinzo Iwai et al. | 310/49 |
| 3,500,156 | 3/1970 | Thomas | 318/138 |
| 3,751,696 | 8/1973 | Morreab | 310/49 |
| 3,783,313 | 1/1974 | Mathur | 310/114 X |
| 3,984,711 | 10/1976 | Kordik | 310/49 R |
| 4,048,531 | 9/1977 | Buess et al. | 310/49 |

Primary Examiner—Donovan F. Duggan
Attorney, Agent, or Firm—Leydig, Voit, & Mayer, Ltd.

[57] ABSTRACT

The rotor of a stepping motor includes two axially spaced sections each formed with radially projecting and angularly spaced teeth. The angular width of the teeth of one section is approximately the same as the angular width of the pole pieces of the stator of the motor and, as a result, the motor possesses good dynamic torque, good damping characteristics and a high response speed. The angular width of the teeth of the other rotor section is greater than the angular width of the teeth of the first section so as to cause the rotor to stop in a stable detent position and to improve the stepping accuracy of the motor.

6 Claims, 7 Drawing Figures

STEPPING MOTOR HAVING ROTOR WITH AXIALLY SPACED SECTIONS

BACKGROUND OF THE INVENTION

This invention relates to variable reluctance step motors of the type in which a rotor member is rotatably stepped relative to a stator member by magnetic flux produced as a result of the simultaneous energization of adjacent windings which extend around circumferentially spaced pole pieces on one of the members.

SUMMARY OF THE INVENTION

The general aim of the present invention is to provide a new and improved stepping motor which possesses good dynamic torque, good damping characteristics and a high response speed and which, at the same time, possesses very good stepping accuracy.

A more detailed object is to achieve the foregoing by providing a stepping motor in which the rotor includes two axially spaced rotor sections each having angularly spaced and radially projecting pole pieces or teeth which coact with the pole pieces of the stator. The angular width of the teeth of one rotor section is different from the angular width of the teeth of the other rotor section so as to enable the motor to attain the desirable performance characteristics enumerated above.

These and other objects and advantage of the invention will become more apparent from the following detailed description when taken in conjunction with the accompanying drawings.

DETAILED DESCRIPTION OF THE PREFERRED EMBODIMENT

Figure 1:
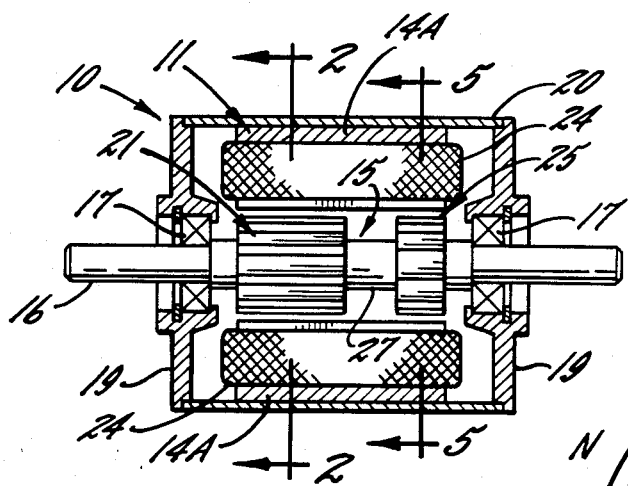
FIG. 1 is a cross-sectional view taken axially through a new and improved step motor embodying the unique features of the present invention.

One type of step motor to which the principles of the present invention may be applied is a three phase variable reluctance motor 10. The motor comprises a stator member 11 formed by a laminated stack of thin soft iron plates defining an outer ring 13 and a plurality (herein, twelve) of radially inwardly extending identical pole pieces 14 having arcuately concave inner ends or tips. The pole pieces are spaced equally and circumferentially around the ring and are grouped into three sets 14A, 14B and 14C (commonly referred to as "phases") each containing four pole pieces spaced 90 degrees from one another. Adjacent pole pieces of each phase are separated from one another by a pole piece of each of the other two phases and, in this instance, the pole pieces alternate clockwise around the ring 13 in the sequence A, B and C.

Disposed within the circle defined by the tips of the pole pieces 14 is a rotor member 15 (FIG. 1) having a central shaft 16 journaled in a pair of bearings 17 mounted in end plates 19. The latter are connected to opposite ends of a cylindrical housing 20 within which the stator 11 is secured. The rotor 15 further comprises a magnetically permeable toothed section 21 secured to the shaft and defined by an inner annulus 22 (FIG. 2) and a first set of eight equally spaced and identical pole pieces or teeth 23 extending radially outwardly from the annulus. The outer ends of the teeth are arcuately convex, have substantially the same width as the tips of the stator pole pieces 14, and are of a radial length such that small radial air gaps exist between the teeth and the pole pieces when the teeth are disposed in opposing relation with the pole pieces.

Step-by-step rotation of the rotor 15 is effected by intermittently exciting the pole pieces 14 of the three phases in a predetermined sequence, the four pole pieces of a given phase being excited simultaneously. For this purpose, multi-turn windings 24 (FIG. 2) are wound around the pole pieces 14. The windings are wound in a pattern such that adjacent pole pieces have opposite polarities when the windings are energized. In the illustrated embodiment, the phase A pole piece 14A at the top of the ring 13 is a north pole while the adjacent pole piece 14B is a south pole, the next pole piece 14C a north pole, the adjacent phase A pole piece 14A a south pole and so on around the ring. The four windings of each phase are serially connected to each other to form three series paths which are connected to a suitable dc. voltage source.

Figure 2:
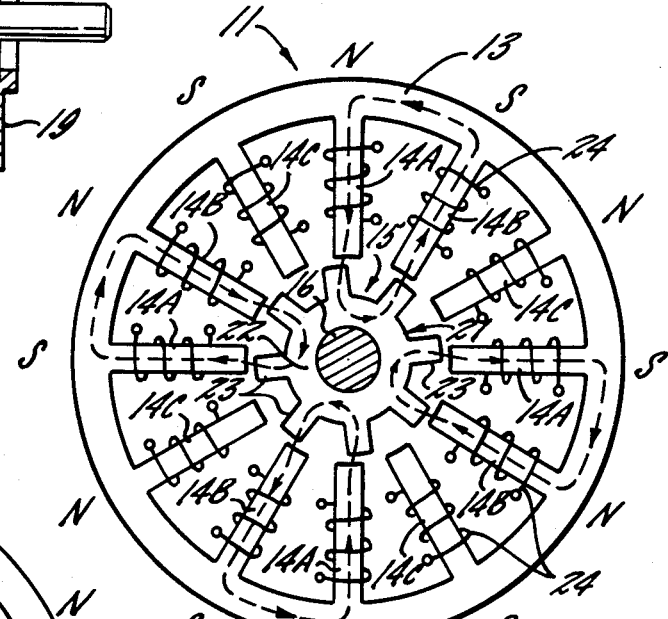
FIG. 2 is an enlarged cross-section taken substantially along the line 2—2 of FIG. 1 and showing the rotor and the stator of the motor somewhat schematically.

To explain the operation of the motor 10 as described thus far, let it be assumed that the rotor 15 is positioned as illustrated in FIG. 2 in which certain diametrically opposite teeth 23 are disposed in partial circumferential alinement (e.g., half alined) with the phase A pole pieces 14A and in which the remaining diametrically opposite teeth are disposed in partial circumferential alinement with the phase B pole pieces 14B. The position shown in FIG. 2 is one of the stop or detent positions of the rotor 15 and is the position which the rotor occupies when the windings 24 on the pole pieces 14A and 14B are continuously energized. When the rotor is in this position, magnetic flux threads a circuit extending out of each pole piece 14A, through the rotor 15, into the adjacent pole piece 14B and around the ring 13 back to the pole piece 14A (see FIG. 2).

In order to effect clockwise rotation of the rotor through one step, the phase A windings 24 are left in an energized state, the phase B windings are de-energized, and the phase C windings are energized. This results in flux threading through the four circuits shown in FIG. 3 and causes the rotor to step clockwise through fifteen degrees to a position in which certain diametrically opposed teeth 23 are half-alined with the phase A pole pieces 14A while the remaining diametrically spaced teeth are half-alined with the phase C pole pieces 14C. The next fifteen degree step of the rotor is effected by leaving the phase C windings 24 energized, by de-energizing the phase A windings and by energizing the phase B windings. The flux then threads the four circuits shown in FIG. 4 and causes the rotor to step to the position illustrated in that view. The phase C windings then are de-energized and, while the phase B windings are kept in an energized state, the phase A windings are energized to repeat the cycle and to cause the rotor to assume a position similar to that shown in FIG. 2.

As described thus far, the motor 10 is of conventional construction. Because the pole pieces 14 and the rotor teeth 23 are of substantially the same angular width, certain performance characteristics of the motor are good. For example, the motor possesses good dynamic torque, good damping characterisitcs and a high response speed. The stepping accuracy, however, of such a motor is poor. Because the rotor 15 stops with its teeth 23 in half-alinement with the pole pieces 14, the rotor is in an unstable detent position. In other words, the flux threading between one energized pole piece 14 and the opposing half-alined rotor tooth 23 attempts to turn the rotor in one direction while the flux threading between the adjacent energized pole piece and its opposing half-alined rotor tooth attempts to turn the rotor in the opposite direction. Because of bearing friction and because of winding-to-winding resistance variations, the detent position is unstable and this results in the motor 10 possessing poor stepping accuracy. Stated differently, the angle through which the rotor turns during each step may vary widely from step-to-step.

In accordance with the present invention, the desirable performance characteristics of the motor 10 are retained for the most part and, at the same time, the stepping accuracy of the motor is improved by uniquely forming the rotor 15 with a second toothed section 25 (FIG. 1 and FIGS. 5 to 7) having a second set of pole pieces or teeth 26 which are wider than the teeth 23 of the rotor section 21. As will become apparent subsequently, the wide teeth 26 of the rotor section 25 coact with the pole pieces 14 to hold the rotor stable when the rotor is in its detent positions and thus serve to improve the stepping accuracy of the motor.

More specifically, the rotor section 25 herein has a shorter axial length than the rotor section 21, is secured to the shaft 16 in axially spaced relation from the rotor section 25 and is magnetically isolated from the rotor section 21 by air or preferably by a non-magnetic spacer 27 (FIG. 1). The latter is sandwiched between the two rotor sections and is secured to the shaft 16.

The rotor section 25 is made of magnetically permeable material and includes a central annulus 30 (FIG. 5) with eight angularly spaced and radially projecting identical pole pieces or teeth 26. The centerlines of the teeth 26 of the rotor section 25 are alined angularly with the centerlines of the teeth 23 of the rotor section 21.

In carrying out the invention, the angular width of each tooth 26 is substantially greater than the angular width of each tooth 23 but, in the specific motor 10 which has been disclosed, is less than twice the angular width of each pole piece 23. By way of example, the angular width of each tooth 26 is about 0.175" while the angular width of each pole piece 14 and each tooth 23 is about 0.090".

Figure 3:
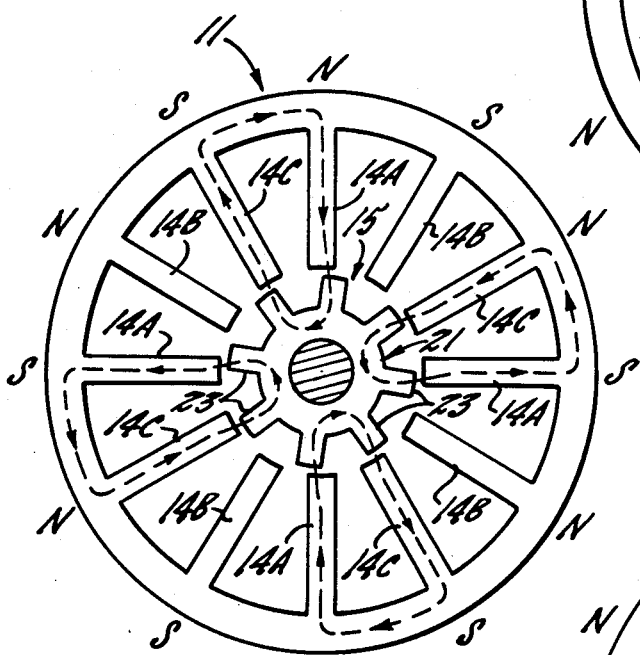
FIGS. 3 and 4 are views similar to FIG. 2 but show the rotor in successively moved positions.
Figure 4:
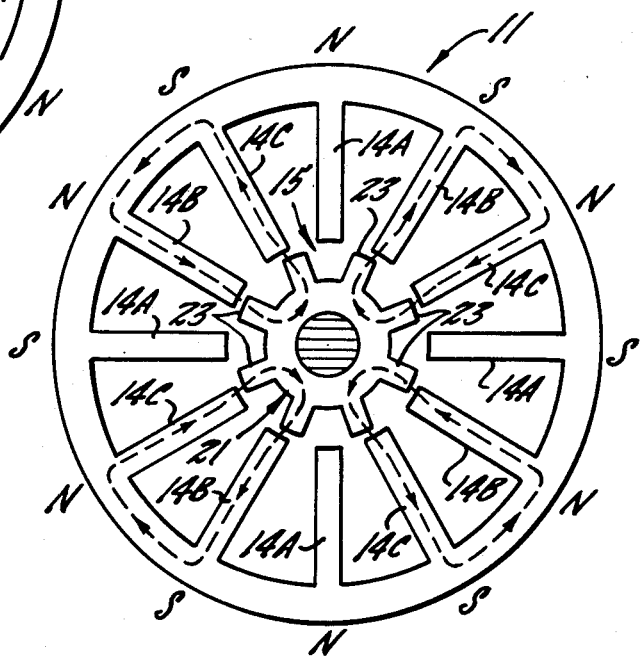
Figure 5:
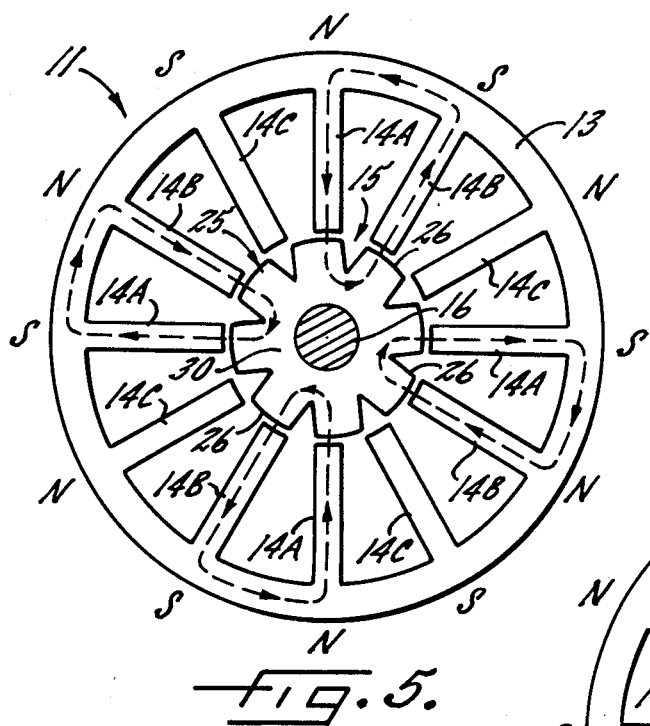
FIG. 5 is an enlarged cross-section taken substantially along the line 5—5 of FIG. 1.
Figure 6:
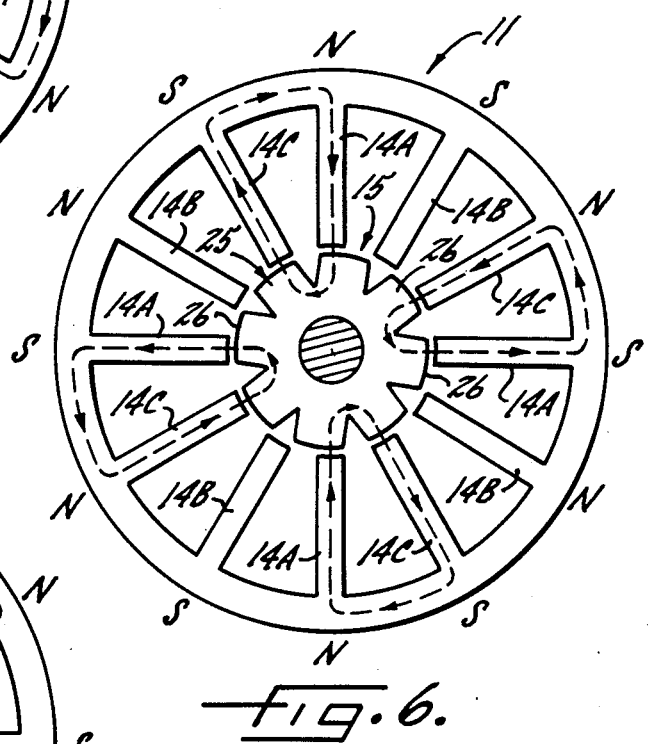
FIGS. 6 and 7 are views similar to FIG. 5 but show the rotor in successively moved positions.
Figure 7:
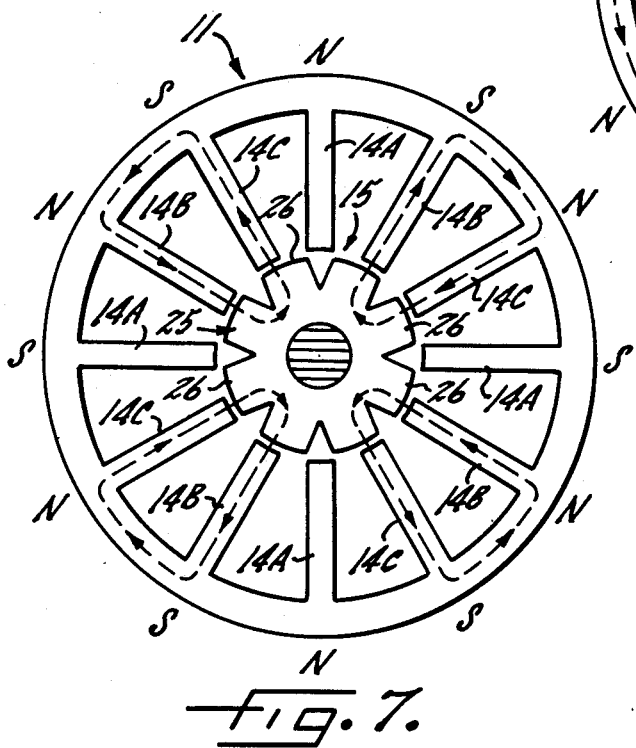

With the foregoing arrangement, the wide teeth 26 stop or detent in the positions shown in FIGS. 5, 6 and 7 when the teeth 23 stop in the positions shown in FIGS. 2, 3 and 4, respectively. Taking the detent position shown in FIG. 2 by way of example, it will be seen that one wide tooth 26 is disposed in opposing relation with the full cross-sectional area of the tip of an excited pole piece 14A while the next clockwise wide tooth is disposed in opposing relation with the full cross-sectional area of the tip of the adjacent excited pole piece 14B. Adjacent edges of the adjacent teeth are alined with adjacent edges of the adjacent pole pieces 14A and 14B. Because of this and because the full cross-sectional area of each excited pole piece 14 is opposed by a tooth 26, the magnetic flux threading each path is angularly balanced as the flux cuts across the gaps between the pole pieces and the teeth. That is to say, the flux does not tend to turn the rotor in one direction or the other and thus the rotor stops in a stable detent position. Because the detent position is stable, the angle through which the rotor turns is virtually the same for each step and thus the stepping accuracy of the motor is improved.

I claim:

1. A rotary stepping motor comprising a stator member, a rotor member telescoped with and rotatable relative to said stator member, each of said members having angularly spaced pole pieces projecting radially toward the pole pieces of the other member, the pole pieces of one of said members being defined by two axially spaced sets of pole pieces, the pole pieces of one of said sets each having an angular width which is less than the angular width of the pole pieces of the other set, and windings on the pole pieces of said stator member and selectively energizable in a predetermined sequence to produce a rotating magnetic field having flux which threads through the axially spaced sets of pole pieces of said one member and through the pole pieces of the other member.

2. A rotary stepping motor as defined in claim 1 in which said rotor member is telescoped into said stator member, the axially spaced sets of pole pieces constituting the pole pieces of said rotor member.

3. A rotary stepping motor comprising a stator, a rotor telescoped into and rotatable within said stator, said stator having angularly spaced pole pieces projecting radially inwardly toward said rotor, said rotor having angularly spaced pole pieces projecting radially outwardly toward the pole pieces of said stator, the pole pieces of said rotor being defined by first and second axially spaced sets of pole pieces, the tips of the pole pieces of said first set each having an angular width which is less than the angular width of the tips of the pole pieces of said second set, and windings on the pole pieces of said stator and selectively energizable in a predetermined sequence to produce a rotating magnetic field having flux which threads through the pole pieces of said stator and through both sets of pole pieces of said rotor.

4. A rotary stepping motor as defined in claim 3 further including a non-magnetic spacer located between said first and second sets of pole pieces.

5. A rotary stepping motor as defined in claim 3 in which the angular width of the tips of the pole pieces of said first set is approximately equal to the angular width of the tips of the pole pieces of said stator, the angular width of the tips of the pole pieces of said second set being greater than the angular width of the tips of the pole pieces of said stator.

6. A rotary stepping motor as defined in claim 5 in which the angular width of the tips of the pole pieces of said second set is less than twice the angular width of the tips of the pole pieces of said first set.

* * * * *